United States Patent
Nishida et al.

(10) Patent No.: US 10,714,772 B2
(45) Date of Patent: Jul. 14, 2020

(54) FUEL CELL SYSTEM WITH IMPROVED LEAK DETECTION

(71) Applicant: TOYOTA JIDOSHA KABUSHIKI KAISHA, Toyota-shi, Aichi-ken (JP)

(72) Inventors: Tomoyuki Nishida, Miyoshi (JP); Tomotaka Ishikawa, Nagoya (JP); Keitaro Yamamori, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 409 days.

(21) Appl. No.: 15/608,951

(22) Filed: May 30, 2017

(65) Prior Publication Data
US 2018/0026284 A1    Jan. 25, 2018

(30) Foreign Application Priority Data

Jul. 21, 2016 (JP) .................................. 2016-143079

(51) Int. Cl.
 *H01M 8/04537* (2016.01)
 *H01M 8/04007* (2016.01)
 (Continued)

(52) U.S. Cl.
 CPC ..... *H01M 8/04604* (2013.01); *H01M 8/0258* (2013.01); *H01M 8/0267* (2013.01);
 (Continued)

(58) Field of Classification Search
 CPC .. H08M 8/0258; H08M 8/026; H08M 8/0263; H08M 8/0265; H08M 8/0267; H08M 8/2483; H08M 8/04358
 See application file for complete search history.

(56) References Cited

U.S. PATENT DOCUMENTS

2006/0196634 A1*  9/2006  Sato .................. B60H 1/00885
                                                 165/41
2012/0255366 A1* 10/2012  Cai .................. H01M 8/04417
                                                 73/861
(Continued)

FOREIGN PATENT DOCUMENTS

JP       2003-168454 A      6/2003
JP       2005-285489 A     10/2005
(Continued)

*Primary Examiner* — Jesse Y Miyoshi
(74) *Attorney, Agent, or Firm* — Dickinson Wright PLLC

(57) ABSTRACT

A fuel cell system comprises a fuel cell, a cooling system, a rotating speed acquisition part acquiring a rotating speed of the refrigerant pump, a power consumption acquisition part acquiring a power consumption of the refrigerant pump, and a controller configured to receive a rotating speed acquired by the rotating speed acquisition part and control the refrigerant pump. The controller has stored therein a predetermined correspondence between rotating speeds of the refrigerant pump and power consumption threshold values. The controller executes a refrigerant leak decision process for deciding presence or absence of a refrigerant leak while executing constant rotating speed control for the refrigerant pump, and in the refrigerant leak decision process, with reference to the correspondence by using a rotating speed value acquired by the rotating speed acquisition part, the controller determines a power consumption threshold value corresponding to the rotating speed value, and decides that a refrigerant leak has occurred if a power consumption value acquired by the power consumption acquisition part is equal to or lower than the power consumption threshold value corresponding to the rotating speed value.

3 Claims, 8 Drawing Sheets

(51) Int. Cl.
*H01M 8/0432* (2016.01)
*H01M 8/04664* (2016.01)
*H01M 8/0267* (2016.01)
*H01M 8/0258* (2016.01)

(52) U.S. Cl.
CPC ... *H01M 8/04067* (2013.01); *H01M 8/04358* (2013.01); *H01M 8/04679* (2013.01); *H01M 8/04007* (2013.01)

(56) References Cited

U.S. PATENT DOCUMENTS

2013/0323539 A1* 12/2013 Furusawa ......... H01M 8/04007 429/9
2017/0350303 A1* 12/2017 Duan ..................... F01P 3/02

FOREIGN PATENT DOCUMENTS

| JP | 2008057340 A | 3/2008 |
| JP | 2010287361 A | 12/2010 |
| JP | 2014086156 A | 5/2014 |

* cited by examiner

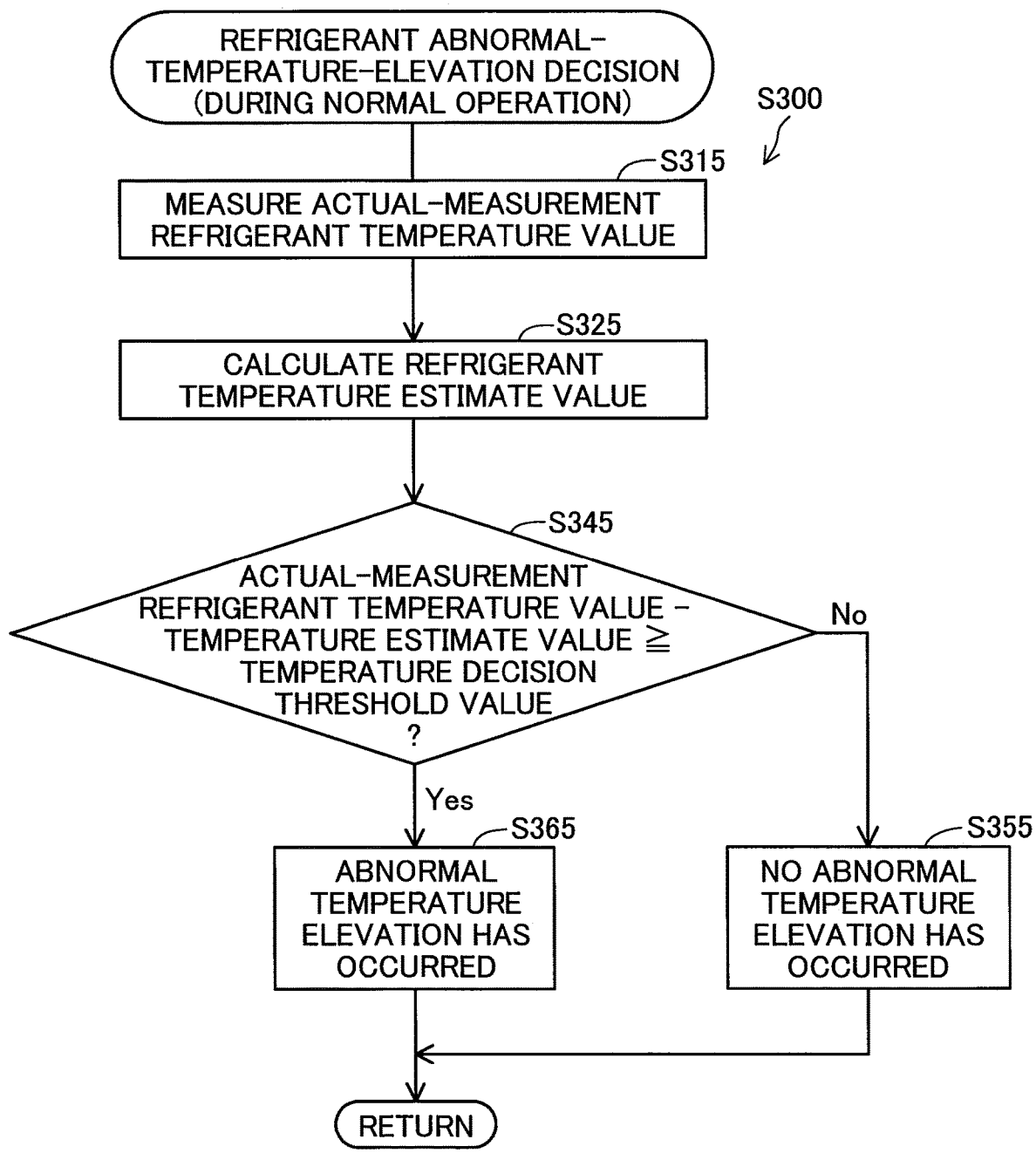

FUEL CELL SYSTEM WITH IMPROVED LEAK DETECTION

CROSS REFERENCE TO RELATED APPLICATIONS

This application claims priority to Japanese Patent Application No. 2016-143079 filed on Jul. 21, 2016, the entire contents of which are incorporated by reference herein.

BACKGROUND

Field

The present disclosure relates to a fuel cell system.

Related Art

JP2005-285489A discloses a fuel cell system in which a pressure sensor is used to make a decision as to occurrence of a leak in a cooling water circulation circuit. In this fuel cell system, a cooling water pump and a pressure sensor are provided on the fuel-cell cooling water circulation circuit, so that when an inlet pressure of the cooling water pump detected by the pressure sensor is lower than a predetermined reference pressure, it is decided that a water leak has occurred to the cooling water circulation circuit.

However, the fuel cell system of JP2005-285489A needs to be provided with a dedicated pressure sensor for leak decision, thereby increasing the number of parts. Thus, there is a desire for a technique that allows leak decision to be made without providing any dedicated pressure sensor for leak decision.

SUMMARY

The present disclosure, having been accomplished to solve at least part of the above-described problems, can be implemented in the following aspects.

(1) In one aspect of the disclosure, there is provided a fuel cell system. The fuel cell system comprises: a fuel cell; a cooling system having a refrigerant pump configured to deliver a refrigerant to the fuel cell; a rotating speed acquisition part configured to acquire a rotating speed of the refrigerant pump; a power consumption acquisition part configured to acquire a power consumption of the refrigerant pump; and a controller configured to receive a rotating speed acquired by the rotating speed acquisition part and control the refrigerant pump. The controller has stored therein a predetermined correspondence between rotating speeds of the refrigerant pump and power consumption threshold values. The controller is configured to execute a refrigerant leak decision process for deciding presence or absence of a refrigerant leak while executing constant rotating speed control for the refrigerant pump, and in the refrigerant leak decision process, with reference to the correspondence by using a rotating speed value acquired by the rotating speed acquisition part, the controller determines a power consumption threshold value corresponding to the rotating speed value, and decides that a refrigerant leak has occurred if a power consumption value acquired by the power consumption acquisition part is equal to or lower than the power consumption threshold value corresponding to the rotating speed value.

According to the fuel cell system of this aspect, when a power consumption value of the refrigerant pump acquired by the power consumption acquisition part is equal to or lower than a power consumption threshold value corresponding to a rotating speed value of the refrigerant pump acquired by the rotating speed acquisition part, the controller decides that a refrigerant leak has occurred. Thus, a refrigerant leak decision can be made without providing any dedicated pressure sensor for leak-decision.

(2) In the above aspect, when the rotating speed value is less than a predetermined rotating speed threshold value, the controller may increase the rotating speed of the refrigerant pump to the rotating speed threshold value or more before executing the refrigerant leak decision process.

According to this aspect, since the controller increases the rotating speed of the refrigerant pump to the rotating speed threshold value or more before executing the refrigerant leak decision process, variations in power consumption due to the presence or absence of refrigerant leaks become more definite so that the decision as to a refrigerant leak can be made with higher accuracy.

(3) In the above aspect, the fuel cell system may further comprises an outlet temperature sensor configured to measure a temperature of the refrigerant at a refrigerant outlet of the fuel cell, wherein the controller may be configured to decide whether or not a refrigerant temperature measured by the outlet temperature sensor satisfies an abnormal-temperature-rise condition that is set in advance as a possible result from a refrigerant leak, and if the abnormal-temperature-rise condition is satisfied and if the rotating speed value is less than the rotating speed threshold value, the controller may increase the rotating speed of the refrigerant pump to the rotating speed threshold value or more before executing the refrigerant leak decision process.

When the refrigerant has undergone an abnormal temperature rise, it is more likely that a refrigerant leak has occurred. According to the fuel cell system of this aspect, when it is decided that the refrigerant has undergone an abnormal temperature rise, the controller sets the rotating speed of the refrigerant pump to the rotating speed threshold value or more before executing the refrigerant leak decision process. Thus, the decision as to a refrigerant leak can be accomplished with even higher accuracy.

(4) In the above aspect, the controller may be configured to: acquire, as an initial refrigerant temperature value, a refrigerant temperature measured by the outlet temperature sensor at a start-up of the fuel cell system, thereafter calculate a temperature estimate value of the refrigerant at the refrigerant outlet based on an operating state of the fuel cell system, and then acquire, as an actual-measurement refrigerant temperature value, a refrigerant temperature measured by the outlet temperature sensor at a time point when the temperature estimate value has reached a predetermined decision start threshold value, and decide that the abnormal-temperature-rise condition has been satisfied if an actual-measurement refrigerant temperature rise value, which is a difference resulting from subtracting the initial refrigerant temperature value from the actual-measurement refrigerant temperature value, is equal to or less than a predetermined temperature rise threshold value at a time point when the actual-measurement refrigerant temperature value has been acquired.

When the refrigerant temperature is not elevated enough at a start-up of the fuel cell system, it is more likely that a refrigerant leak has occurred. According to the fuel cell system of this aspect, when the refrigerant temperature is not elevated enough upon start-up of the fuel cell system, the controller, deciding that the refrigerant has undergone an abnormal temperature rise, sets the rotating speed of the refrigerant pump to the rotating speed threshold value or more before executing the refrigerant leak decision process. Thus, the decision as to a refrigerant leak can be accomplished with even higher accuracy.

(5) In the above aspect, the controller may be configured to: acquire, as an actual-measurement refrigerant temperature value, a refrigerant temperature measured by the outlet temperature sensor during normal operation of the fuel cell system, and calculate a temperature estimate value of the refrigerant at the refrigerant outlet based on an operating state of the fuel cell system, and decide that the abnormal-temperature-rise condition has been satisfied if a difference resulting from subtracting the temperature estimate value from the actual-measurement refrigerant temperature value is equal to or more than a predetermined temperature decision threshold value.

During the normal operation of the fuel cell system, when the refrigerant temperature is elevated excessively, it is more likely that a refrigerant leak has occurred. According to the fuel cell system of this aspect, when the refrigerant temperature is elevated excessively during normal operation of the fuel cell system, the controller sets the rotating speed of the refrigerant pump to the rotating speed threshold value or more before executing the refrigerant leak decision process. Thus, the decision as to a refrigerant leak can be accomplished with even higher accuracy.

The present disclosure may also be implemented in various modes other than the above-described aspects. For example, the disclosure may be implemented in such modes as a refrigerant leak decision method for fuel cells.

BRIEF DESCRIPTION OF THE DRAWINGS

FIG. 8 is a flowchart for explaining a refrigerant abnormal-temperature-rise decision during normal operation of the fuel cell system.

DESCRIPTION OF THE EMBODIMENTS

First Embodiment

Figure 1:
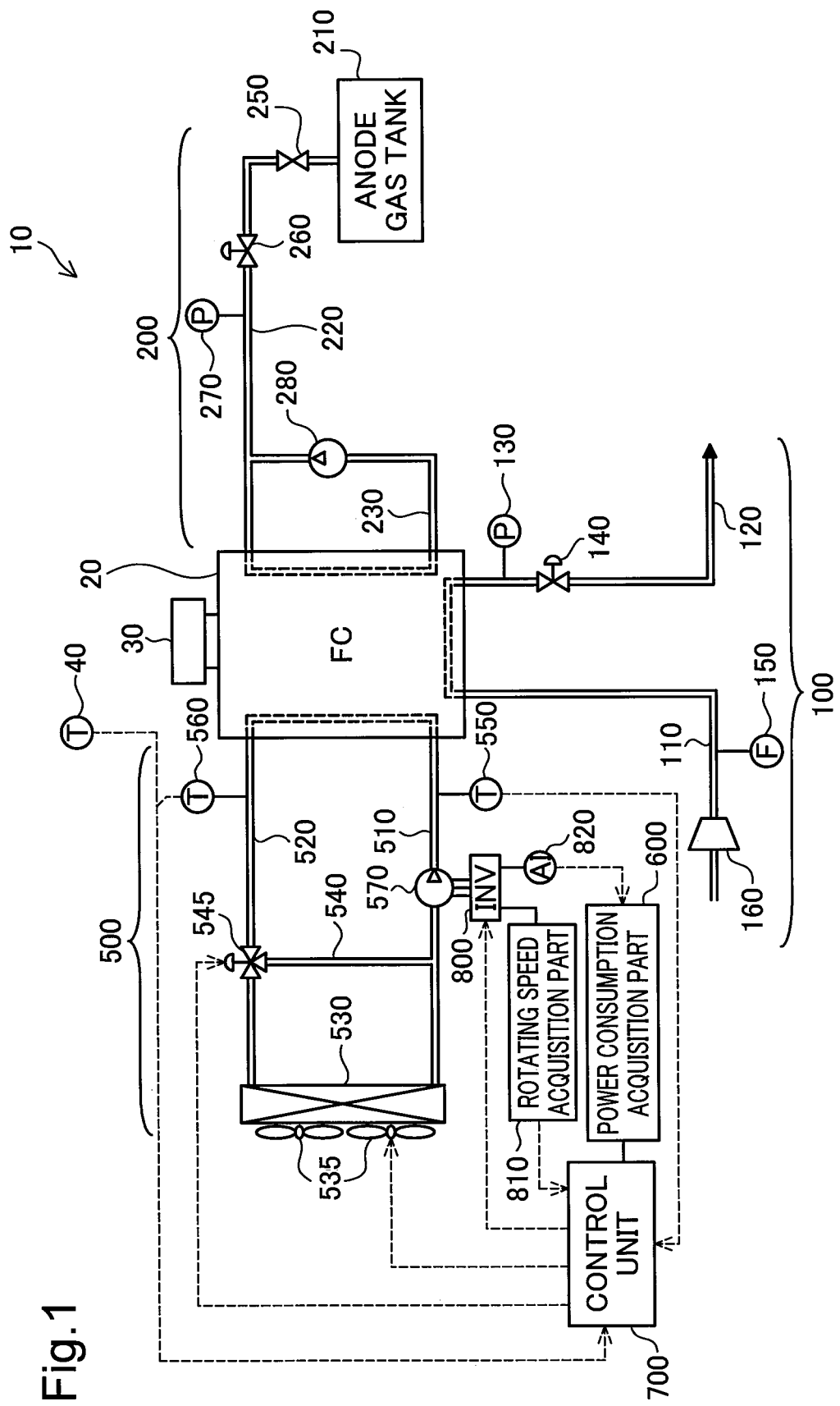
FIG. 1 is an explanatory view schematically showing a fuel cell system according to a first embodiment of the present disclosure.

FIG. 1 is an explanatory view schematically showing a fuel cell system 10 according to a first embodiment. The fuel cell system 10 includes a fuel cell 20, a cathode gas supply/discharge system 100, an anode gas supply system 200, an FC cooling system 500, a power consumption acquisition part 600, and a controller 700. This embodiment will be described on a fuel cell system which is mounted on a fuel cell vehicle as an example. The fuel cell vehicle runs with a motor driven by electricity generated by the fuel cell 20. However, the fuel cell system of this embodiment is not limited to use for fuel cell vehicles and may be applied to other uses.

The fuel cell 20 is, for example, a solid polymer type fuel cell, including a cell stack in which a plurality of unit cells are stacked. Each unit cell has an MEA (Membrane Electrode Assembly) composed of a polyelectrolyte membrane sandwiched between a pair of electrodes, and a pair of separators sandwiching the MEA from both sides. The fuel cell 20 generates electric power through oxidation-reduction reactions between cathode gas and anode gas. Also, an FC sensor 30 is provided in the fuel cell 20 to measure a power generation voltage and a power generation current of the fuel cell 20. In addition, an ambient air temperature sensor 40 for measuring an ambient air temperature is placed near the fuel cell 20.

The cathode gas supply/discharge system 100 includes a cathode gas supply pipe 110 and a cathode gas discharge pipe 120. An air compressor 160 and a gas flow rate sensor 150 are provided on the cathode gas supply pipe 110. The air compressor 160 supplies air, which is taken in from outside the system, to the fuel cell 20 as cathode gas. The gas flow rate sensor 150 measures an air flow rate. A pressure sensor 130 and a pressure regulating valve 140 are provided on the cathode gas discharge pipe 120. The pressure regulating valve 140 adjusts the pressure of the cathode gas in the fuel cell 20. The pressure sensor 130 measures a pressure of the cathode gas at a cathode gas outlet of the fuel cell 20.

The anode gas supply system 200 includes an anode gas tank 210, an anode gas supply pipe 220, an anode gas return pipe 230, a main stop valve 250, a pressure regulating valve 260, a pressure sensor 270, and an anode gas pump 280. The anode gas tank 210 stores, for example, high-pressure hydrogen gas. The anode gas tank 210 is connected to the fuel cell 20 via the anode gas supply pipe 220. Provided on the anode gas supply pipe 220 are the main stop valve 250, the pressure regulating valve 260, and the pressure sensor 270, in this order starting with the anode gas tank 210 side. The main stop valve 250 turns on and off the supply of the anode gas from the anode gas tank 210. The pressure regulating valve 260 regulates the pressure of the anode gas supplied to the fuel cell 20. The pressure sensor 270 measures the pressure of the anode gas supplied to the fuel cell 20. The anode gas return pipe 230 is piping for returning anode gas, which has not been consumed by the fuel cell 20, to the anode gas supply pipe 220. The anode gas pump 280 is provided on the anode gas return pipe 230. The anode gas pump 280 drives anode gas discharged from the fuel cell 20 to deliver the anode gas to the anode gas supply pipe 220.

The FC cooling system 500 includes a refrigerant supply pipe 510, a refrigerant discharge pipe 520, a radiator 530, a bypass pipe 540, a three-way valve 545, a refrigerant pump 570, an inlet temperature sensor 550, and an outlet temperature sensor 560. As the refrigerant, for example, water, ethylene glycol or other nonfreezing water, air, or the like is used. The three-way valve 545 is a valve for adjusting the flow rate of the refrigerant to the radiator 530 and the bypass pipe 540. Radiator fans 535 are provided in the radiator 530.

The refrigerant pump 570 is provided on the refrigerant supply pipe 510 to feed the refrigerant to the fuel cell 20. The refrigerant pump 570 is supplied with an AC voltage from an inverter 800. That is, the inverter 800 converts a DC voltage supplied from the fuel cell 20 or a secondary battery (not shown) into an AC voltage to feed the AC voltage to the refrigerant pump 570. The inverter 800 is provided with a rotating speed acquisition part 810 for acquiring a rotating speed of the refrigerant pump 570, and a voltammeter 820 for measuring a DC current and a DC voltage supplied to the inverter 800. In this embodiment, the controller 700 performs resolver-less or sensor-less control of the refrigerant pump 570, and the rotating speed acquisition part 810 measures an electrical angle from a current or voltage of the motor of the refrigerant pump 570 to calculate a rotating speed from an change in the electrical angle. Instead, the rotating speed may be acquired by using a rotating speed sensor such as a resolver or a rotary encoder. In addition, the refrigerant pump 570 is subjected to constant rotating speed control, when required, by the controller 700.

The inlet temperature sensor 550 and the outlet temperature sensor 560 are provided on the refrigerant supply pipe 510 and the refrigerant discharge pipe 520, respectively. The inlet temperature sensor 550 measures a temperature of the refrigerant at a refrigerant inlet of the fuel cell 20. The outlet temperature sensor 560 measures a temperature of the refrigerant at a refrigerant outlet of the fuel cell 20. Normally, it can be considered that a refrigerant temperature measured by the outlet temperature sensor 560 is substantially equal to the temperature of the fuel cell 20. In addition, the inlet temperature sensor 550 may be provided more upstream, e.g., on the outlet-side pipe of the radiator 530 or at a position immediately following a junction of the outlet-side pipe of the radiator 530 and the bypass pipe 540.

The power consumption acquisition part 600 calculates a power consumption of the refrigerant pump 570 with use of a DC current value and a DC voltage value measured by the voltammeter 820. Instead, another means other than this configuration may be used to acquire a power consumption of the refrigerant pump 570. For example, the power consumption of the refrigerant pump 570 may be calculated with use of a torque command value of the refrigerant pump 570 generated in the controller 700 as well as a rotating speed value of the refrigerant pump 570 acquired by the rotating speed acquisition part 810. In this case, the voltammeter 820 may be omitted. Otherwise, when a DC motor is used as the motor of the refrigerant pump 570, the power consumption may also be calculated from a drive voltage, its duty ratio, and a rotating speed or current value of the DC motor.

The controller 700, which is implemented by a microcomputer including a central processing unit, main memory, and nonvolatile memory, controls operations of various devices in the fuel cell system 10. FIG. 1 shows, in broken lines, connection relationships for control signals and sensor signals between the controller 700 and various devices in the FC cooling system 500. The controller 700 controls the cooling state of the fuel cell 20 by adjusting the rotating speed of the refrigerant pump 570, the rotating speed of the radiator fans 535 and the degree of opening of the three-way valve 545 based on refrigerant temperatures fed from the inlet temperature sensor 550 and the outlet temperature sensor 560. Also, the controller 700 executes a later-described refrigerant leak decision process by using signals fed from the outlet temperature sensor 560, the rotating speed acquisition part 810 and the power consumption acquisition part 600. The controller 700 executes the refrigerant leak decision process while executing constant rotating speed control that makes the refrigerant pump 570 to rotate at a constant rotating speed.

Figure 2:
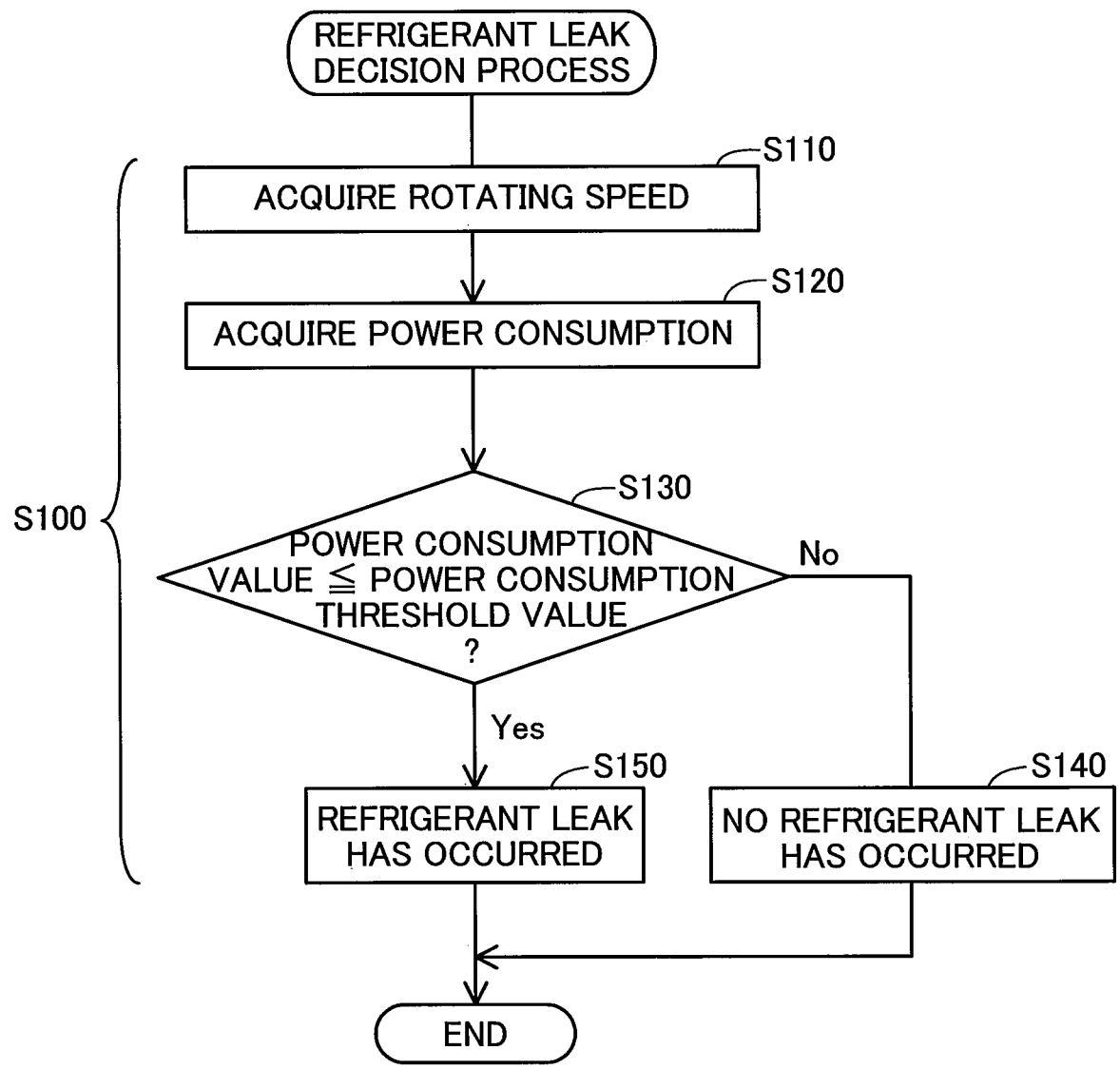
FIG. 2 is a flowchart for explaining a refrigerant leak decision process in the first embodiment.

FIG. 2 is a flowchart of step S100, which is the refrigerant leak decision process in the first embodiment. At step S110, a rotating speed of the refrigerant pump 570 is acquired by the rotating speed acquisition part 810 during the constant rotating speed control, and the rotating speed value is fed to the controller 700. At step S120, a power consumption of the refrigerant pump 570 is acquired by the power consumption acquisition part 600, and the power consumption value is inputted to the controller 700. At step S130, the controller 700 decides whether or not the power consumption value inputted at step S120 is equal to or lower than a power consumption threshold value corresponding to the rotating speed value inputted at step S110. It is noted that a correspondence between rotating speeds of the refrigerant pump 570 and power consumption threshold values is set in advance and stored in the nonvolatile memory in the controller 700.

If the power consumption value of the refrigerant pump 570 is higher than the power consumption threshold value at step S130, the controller 700 decides at step S140 that no refrigerant leak has occurred, and ends the refrigerant leak decision process. On the other hand, when the power consumption value is equal to or lower than the power consumption threshold value, the controller 700 decides at step S150 that a refrigerant leak has occurred, and ends the refrigerant leak decision process. In addition, when it is decided that a refrigerant leak has occurred, the controller 700 may execute a preset leak-decided case operation such as issuing an alarm to the vehicle's driver or stopping the fuel cell system and then switching the vehicle's power source to a secondary battery.

Now, the relationship between the power consumption of the refrigerant pump 570 and the refrigerant leak is described. In the FC cooling system 500 including the refrigerant pump 570, which is operated at a constant rotating speed, the flow rate of the refrigerant decreases upon occurrence of a refrigerant leak, thereby reducing the power consumption required for the refrigerant pump 570 to maintain the same rotating speed as before the occurrence of the refrigerant leak. Therefore, a decrease in the power consumption of the refrigerant pump 570 may be used as a decision criterion for occurrence of a refrigerant leak. This will be further described later.

Another step may be provided between step S110 and step S120 in order to decide whether or not the rotating speed value of the refrigerant pump 570 is normal; that is, whether or not the rotating speed value is within a permissible range around a target rotating speed. In this case, it may follow that if the rotating speed value is normal, the controller 700 executes the next step S120; if the rotating speed value is abnormal, the controller 700 may end the refrigerant leak decision process.

Figure 3:
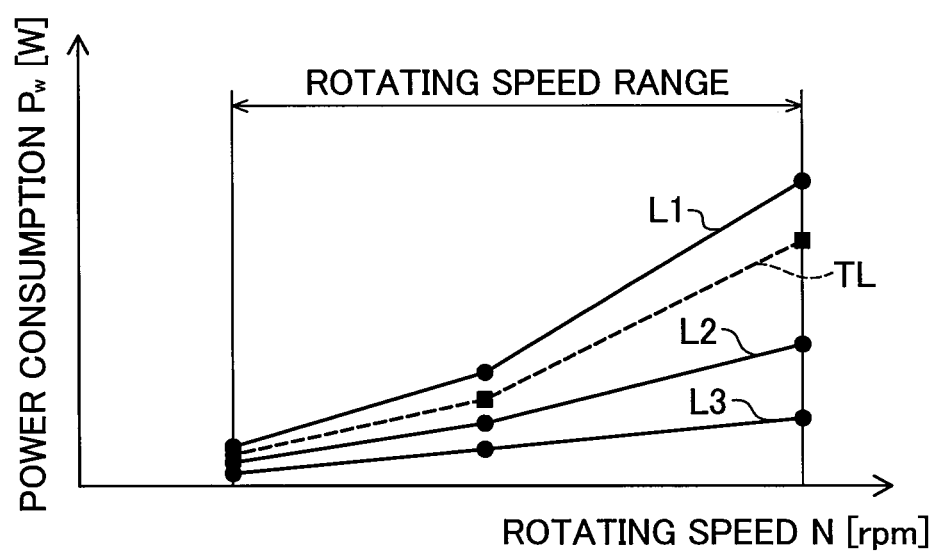
FIG. 3 illustrates an exemplary relationship between the rotating speed of a refrigerant pump and power consumption.

FIG. 3 illustrates an exemplary relationship between the rotating speed N of the refrigerant pump 570 and power consumption $P_W$ in cases where a refrigerant leak has occurred and where no refrigerant leak has occurred. In FIG. 3, four graphs L1, L2, L3, TL are drawn within a rotating speed range under normal operation of the refrigerant pump 570. The graph L1 is a graph showing a correspondence between the rotating speed N of the refrigerant pump 570 and the power consumption $P_W$ in a case where no refrigerant leak has occurred. The graphs L2, L3 each shows a correspondence between the rotating speed N of the refrigerant pump 570 and the power consumption $P_W$ in a case where a refrigerant leak has occurred. The graph TL is a graph showing the correspondence between the rotating speed N of the refrigerant pump 570 and the power consumption threshold value. In this example, within the rotating speed range under normal operation of the refrigerant pump 570, the power consumption $P_W$ of graph L1 on condition that no refrigerant leak has occurred is higher than the power consumption threshold value of graph TL. Meanwhile, the power consumption $P_W$ of graphs L2, L3 on condition that a refrigerant leak has occurred is equal to or lower than the power consumption threshold value of graph TL. Therefore, the presence or absence of any refrigerant leak can be decided by comparing a power consumption value of the refrigerant pump 570 with the power consumption threshold value.

As described hereinabove, in the first embodiment, the controller 700 decides that a refrigerant leak has occurred if a power consumption value of the refrigerant pump 570 acquired by the power consumption acquisition part 600 is equal to or lower than a power consumption threshold value corresponding to a rotating speed value of the refrigerant pump 570 acquired by the rotating speed acquisition part 810. Thus, a decision as to a refrigerant leak can be made without providing any dedicated pressure sensor for leak-decision use.

Second Embodiment

Figure 4:
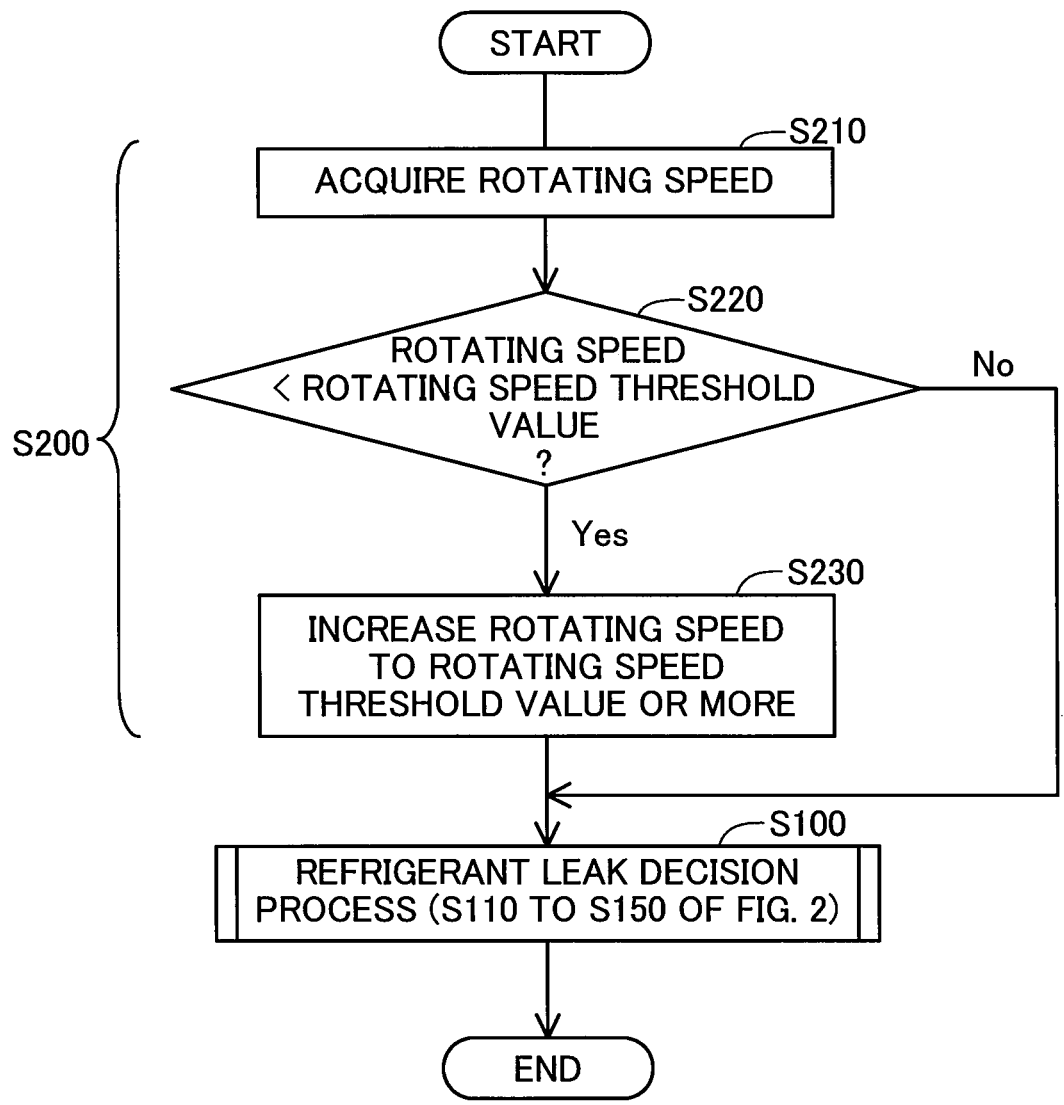
FIG. 4 is a flowchart for explaining a refrigerant leak decision process in a second embodiment.

FIG. 4 is a flowchart for explaining a refrigerant leak decision process in a second embodiment. This processing flow is so constituted that step S200 including steps S210 to S230 is added before the step S100 of FIG. 2. At step S210, a rotating speed value of the refrigerant pump 570 acquired by the rotating speed acquisition part 810 during constant rotating speed control is inputted to the controller 700 as in the case of step S110 of the first embodiment. At step S220, the controller 700 decides whether or not the rotating speed value inputted at step S210 is less than a predetermined rotating speed threshold value. This rotating speed threshold value is a value for deciding whether or not the rotating speed value is proper enough for high-accuracy refrigerant leak decision process.

When the rotating speed value is less than the rotating speed threshold value at step S220, the controller 700 increases the rotating speed of the refrigerant pump 570 to the rotating speed threshold value or more at step S230. When, on the other hand, the rotating speed value is equal to or higher than the rotating speed threshold value at step S220, the controller 700 executes step S100 (steps S110 to S150 of FIG. 2) of the refrigerant leak decision process without increasing the rotating speed of the refrigerant pump 570. In a case of direct move from step S220 to step S100, the controller 700 does not need to execute step S110 of FIG. 2 once again, and the rotating speed value acquired at step S210 may be used as it is.

Figure 5:
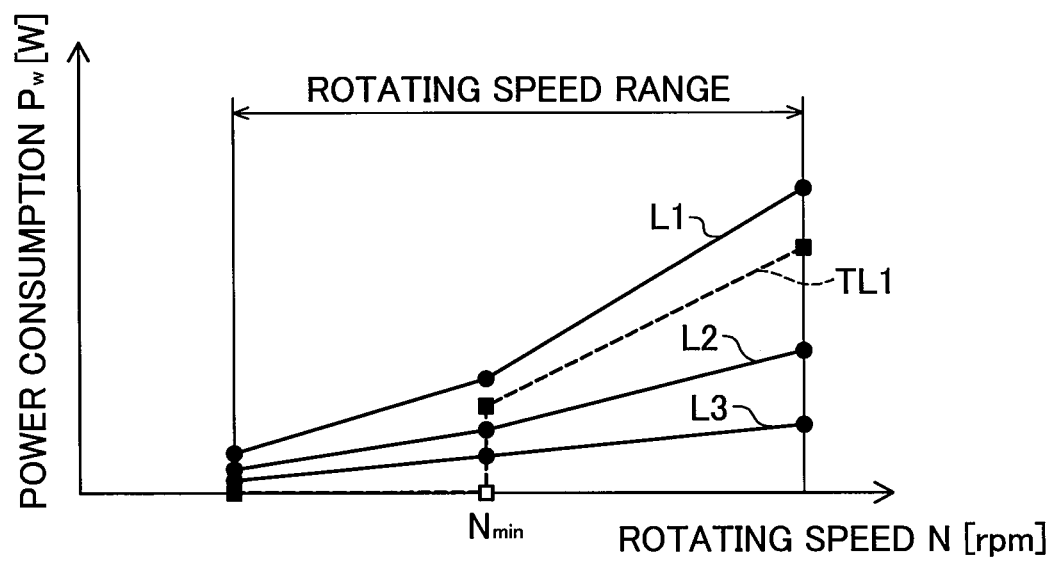
FIG. 5 illustrates an exemplary relationship between the rotating speed of a refrigerant pump and power consumption in the second embodiment.

FIG. 5 illustrates an exemplary relationship between the rotating speed N of the refrigerant pump 570 and power consumption $P_W$ in the second embodiment, the view corresponding to FIG. 3 of the first embodiment. The second embodiment differs from the first embodiment shown in FIG. 3 only in a graph TL1 showing the power consumption decision threshold value, while the other graphs L1, L2, L3 are the same as those of the first embodiment. In this graph TL1, no power consumption threshold value is set for a rotating speed range where the rotating speed is less than a rotating speed threshold value $N_{min}$, while the power consumption threshold value is set for the other range where the rotating speed is equal to or more than the rotating speed threshold value $N_{min}$.

The reason of this is that in the range of less than the rotating speed threshold value $N_{min}$, the accuracy of leak decision dependent on the power consumption $P_W$ may be insufficient because of small variations of the power consumption $P_W$ due to the presence or absence of refrigerant leaks. In the refrigerant leak decision process of the second embodiment, since the rotating speed of the refrigerant pump 570 is increased to the rotating speed threshold value $N_{min}$ or more, the decision as to a refrigerant leak can be made with higher accuracy.

Third Embodiment

Figure 6:
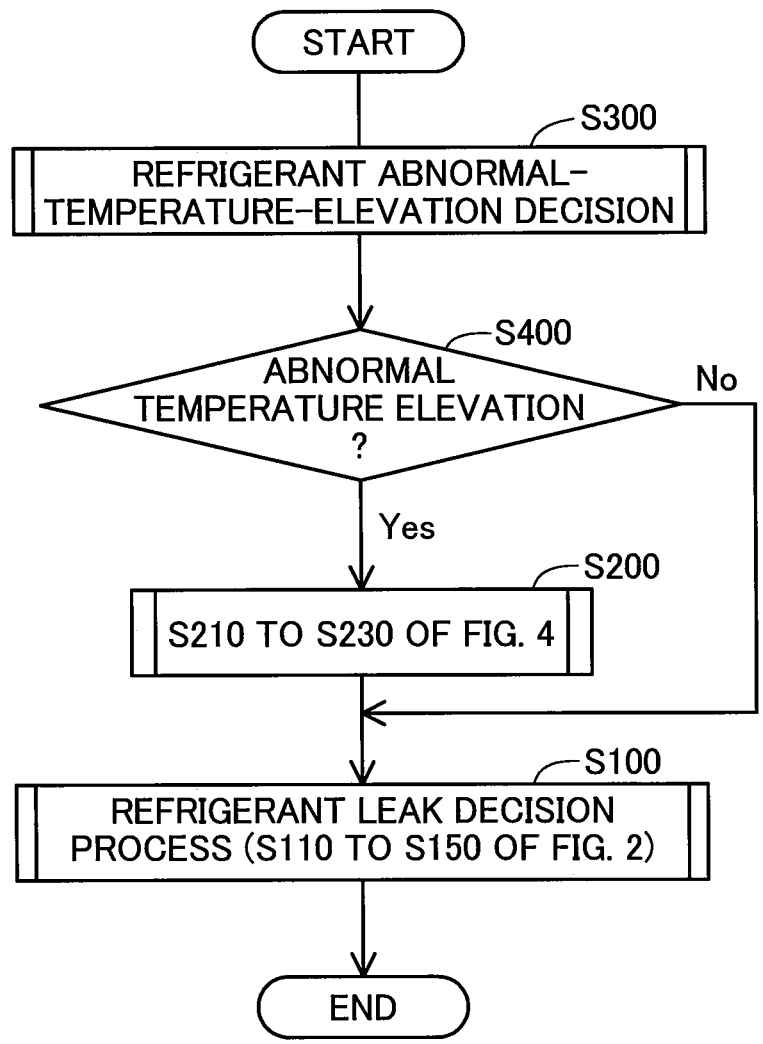
FIG. 6 is a flowchart for explaining a refrigerant leak decision process in a third embodiment.

FIG. 6 is a flowchart for explaining a refrigerant leak decision process in a third embodiment. This processing flow is so constituted that steps S300 and S400 are added before the step S200 of FIG. 4. At step S300, the controller 700 decides whether or not a refrigerant temperature at the refrigerant outlet of the fuel cell 20 has undergone an abnormal temperature rise. This decision as to an abnormal temperature rise is a process of deciding whether or not a relationship between a refrigerant temperature measured by the outlet temperature sensor 560 and a temperature estimate value of the refrigerant at the refrigerant outlet estimated based on a normal operating state of the fuel cell system 10 satisfies an abnormal-temperature-rise condition that is set in advance as a possible result from a refrigerant leak. Detailed contents of the processing will be described later. When it is decided that the refrigerant has undergone an abnormal temperature rise, it is more likely that a refrigerant leak has occurred; conversely, when it is decided that the refrigerant has undergone no abnormal temperature rise, it is less likely that a refrigerant leak has occurred.

At step S400, the processing flow is branched in response to a decision result of step S300. That is, if it is decided at step S300 that the refrigerant has undergone an abnormal temperature rise, it is more likely that a refrigerant leak has occurred; therefore, the controller 700 goes from step S400 to step S200 to execute the steps S200 to S100 (steps S210 to S100 of FIG. 4). On the other hand, if it is decided at step S300 that the refrigerant has undergone no abnormal temperature rise, the controller 700 goes from step S400 to step S100 to execute steps S110 to S150 of FIG. 2. In this case, it is preferable to use the graph TL of FIG. 3 as the power consumption threshold value. In addition, when it is decided that the refrigerant has undergone no abnormal temperature rise, it is less likely that a refrigerant leak has occurred; however, in subsequent execution of step S100, when it is decided at step S150 that a refrigerant leak has occurred, there arises a doubt as to the presence or absence of the refrigerant leak. Such an event tends to occur when the refrigerant leak decision process at step S100 is executed while the rotating speed of the refrigerant pump 570 is less than the rotating speed threshold value. Therefore, in this case, it is preferable to execute the refrigerant leak decision process again after the rotating speed of the refrigerant pump 570 is increased to the rotating speed threshold value or more.

According to the processing flow of FIG. 6, since the rotating speed of the refrigerant pump 570 is set to the rotating speed threshold value or more upon a decision that the refrigerant has undergone an abnormal temperature rise, the decision as to a refrigerant leak can be accomplished more accurately. Contents of step S300 for a refrigerant abnormal-temperature-rise decision will be described in two cases where the fuel cell system 10 is at its start-up and where in normal operation, by FIGS. 7 and 8, respectively. As the step S300, it is preferable to execute at least one of FIGS. 7 and 8.

Figure 7:
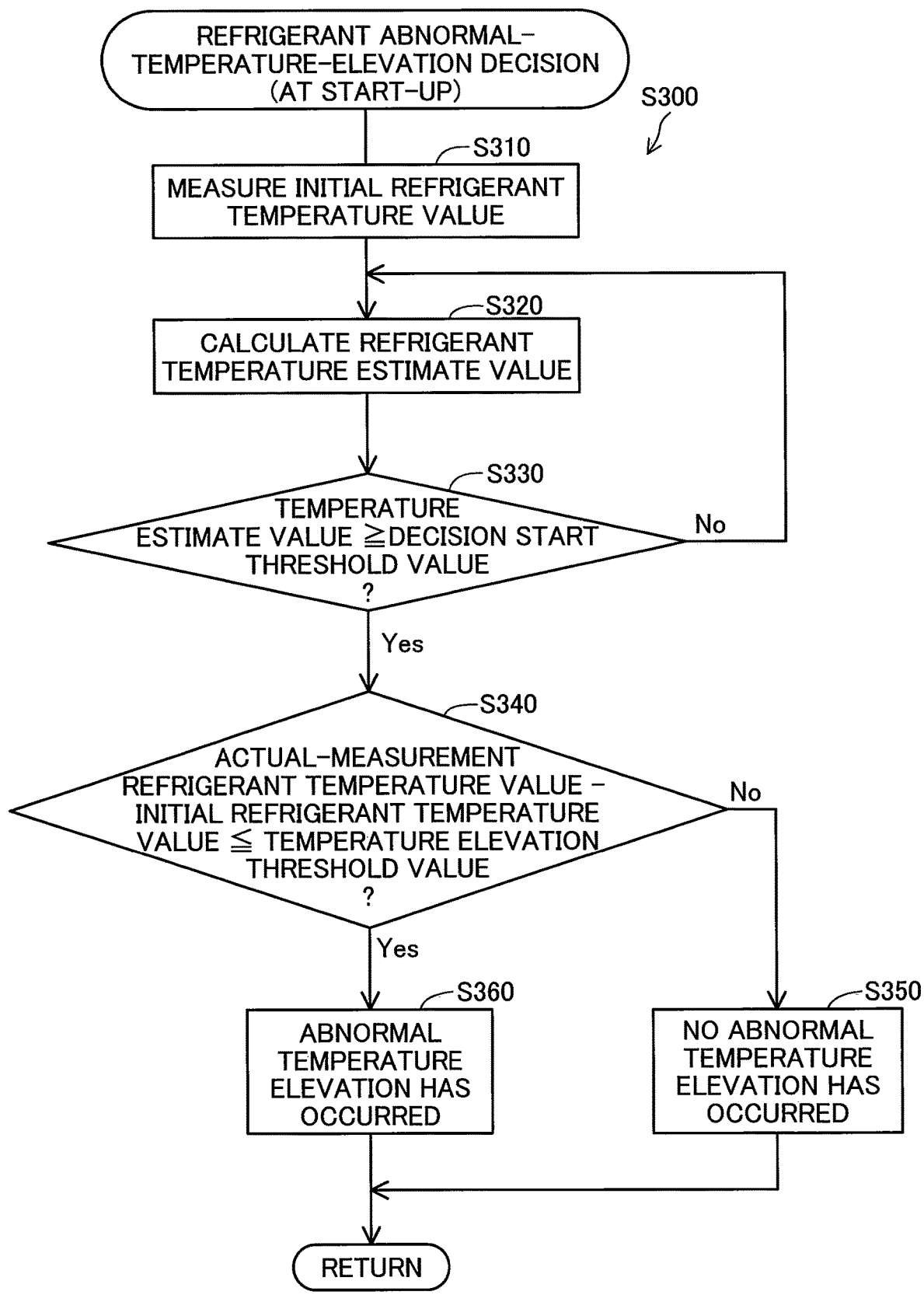
FIG. 7 is a flowchart for explaining a refrigerant abnormal-temperature-rise decision at a start-up of the fuel cell system.

FIG. 7 is a flowchart for explaining details of a refrigerant abnormal-temperature-rise decision process (step S300 of FIG. 6) at a start-up of the fuel cell system 10. When the fuel cell system 10 is started up with a start switch (not shown) pressed, a temperature measured value of the outlet temperature sensor 560 is inputted to the controller 700 at step S310. This temperature measured value is used as an initial refrigerant temperature value. At step S320, the controller 700 calculates a temperature estimate value of the refrigerant at the refrigerant outlet based on the initial refrigerant temperature value of step S310 and an operating state of the fuel cell system 10. An example of this calculation method will be described later. At step S330, the controller 700 decides whether or not the temperature estimate value calculated at step S320 is equal to or higher than a predetermined decision start threshold value.

When the temperature estimate value is less than the decision start threshold value, the controller 700 returns to step S320, repeating steps S320 to S330. When the temperature estimate value has reached the decision start threshold value or more, the controller 700 decides at step S340 whether or not an actual-measurement refrigerant temperature rise value is equal to or lower than a predetermined temperature rise threshold value, where the actual-measurement refrigerant temperature rise value is a difference resulting from subtracting the initial refrigerant temperature value from an actual-measurement refrigerant temperature value measured by the outlet temperature sensor 560 at a time point when the temperature estimate value has reached the decision start threshold value or more. If the actual-measurement refrigerant temperature rise value is equal to or lower than the temperature rise threshold value, the controller 700 decides at step S360 that the refrigerant has undergone an abnormal temperature rise. On the other hand, when the actual-measurement refrigerant temperature rise value is more than the temperature rise threshold value, the controller 700 decides at step S350 that the refrigerant has undergone no abnormal temperature rise.

At a start-up of the fuel cell system, with the refrigerant temperature insufficiently elevated, it is more likely that a refrigerant leak has occurred. Therefore, the presence or absence of a likelihood of a refrigerant leak can be decided by making a decision as to the refrigerant abnormal temperature rise according to steps S310 to S360 of FIG. 7.

A temperature estimate value $T_{es}$ of the refrigerant at the refrigerant outlet may be calculated, for example, by repeating calculations of the following Equations (1) to (4) in this order at a constant period $\Delta t$. In the calculation of the temperature estimate value $T_{es}$ of the refrigerant, it is assumed that part of the heat generation value of the fuel cell 20 transfers to outside air, and that the refrigerant flows fully through the bypass pipe 540 without flowing through the radiator 530.

$$P_e = (V_t - V_m) \times I_m \quad \ldots (1)$$

$$P_c = (T_{es} - T_{am}) \times K \quad \ldots (2)$$

$$\Delta T_{es} = [(P_e - P_c) \times \Delta t]/C_{fc} \quad \ldots (3)$$

$$T_{es} = T_{es} + \Delta T_{es} \quad \ldots (4)$$

where $P_e$ is a heat generation value [W] of the fuel cell 20, $V_t$ is a theoretical electromotive voltage [V] of the fuel cell 20, $V_m$ is a generated-voltage measured value [V] of the fuel cell 20 measured by the FC sensor 30, $I_m$ is a generated-current measured value [W] of the fuel cell 20 measured by the FC sensor 30, $P_c$ is a heat release quantity [W] to the outside air, $\Delta T_{es}$ is a refrigerant temperature-rise estimate value [° C.] over a duration of one period $\Delta t$, $T_{es}$ is a refrigerant temperature estimate value [° C.] where $T_{es}$ equals the initial temperature measured value in an initial state, $T_{am}$ is a temperature measured value [° C.] of the ambient air temperature sensor 40, K is a heat release coefficient [W/° C.] of the fuel cell 20 and the FC cooling system 500, $\Delta t$ is a repetitive period [s] of calculations of Equations (1) to (4), and $C_{fc}$ is a sum [J/° C.] of a heat capacity of the fuel cell 20 and a heat capacity of the refrigerant.

The term "decision start threshold value" used in step S330 refers to a value for deciding whether or not a refrigerant temperature estimate value has reached a sufficient level for starting the refrigerant abnormal-temperature-rise decision, the decision start threshold value being experimentally or empirically set in advance. As the decision start threshold value, for example, a value of 8° C.±5° C. may be used.

The term "temperature rise threshold value" used in step S340 refers to a lower-limit value for deciding, in consideration of influences by errors or disturbance of the outlet temperature sensor 560, whether or not an actual-measurement refrigerant temperature rise value is abnormal at a time point when the refrigerant temperature estimate value has reached the decision start threshold value or more, the temperature rise threshold value being experimentally or empirically set in advance. As the temperature rise threshold value, for example, a value of 4° C.±1° C. may be used.

Furthermore, when the refrigerant has fully leaked before the start-up of the fuel cell system 10, the measured value of the outlet temperature sensor 560 becomes a generally constant value, equal to the ambient air temperature. Accordingly, the difference resulting from subtracting the initial refrigerant temperature value from a temperature measured value of the outlet temperature sensor 560 becomes nearly zero, which is smaller than the temperature rise threshold value. Thus, the decision as to the presence or absence of a likelihood of a refrigerant leak can be fulfilled by the procedure of FIG. 7.

FIG. 8 is a flowchart for explaining details of the refrigerant abnormal-temperature-rise decision process (step S300 of FIG. 6) during normal operation of the fuel cell system 10. It is noted that during the normal operation, the temperature of the fuel cell 20 itself remains generally constant. At step S315, an actual-measurement refrigerant temperature value measured by the outlet temperature sensor 560 is inputted to the controller 700. At step S325, the controller 700 calculates a temperature estimate value of the refrigerant at the refrigerant outlet of the fuel cell 20 based on a temperature measured value of the inlet temperature sensor 550 and an operating state of the fuel cell system 10. An example of this calculation method will be described later. At step S345, the controller 700 decides whether or not a difference resulting from subtracting the temperature estimate value from the actual-measurement refrigerant temperature value is equal to or more than a predetermined temperature decision threshold value. If the difference resulting from subtracting the temperature estimate value from the actual-measurement refrigerant temperature value is equal to or more than the temperature decision threshold value, the controller 700 decides at step S365 that the refrigerant has undergone an abnormal temperature rise. On the other hand, if the difference resulting from subtracting the temperature estimate value from the actual-measurement refrigerant temperature value is less than the temperature decision threshold value, the controller 700 decides at step S355 that the refrigerant has undergone no abnormal temperature rise.

During the normal operation of the fuel cell system, with the refrigerant temperature excessively elevated, it is more likely that a refrigerant leak has occurred. Therefore, the presence or absence of a likelihood of a refrigerant leak can be decided by making a decision as to a refrigerant abnormal temperature rise according to steps S315 to S365 of FIG. 8.

A temperature estimate value $T_{es1}$ of the refrigerant at the refrigerant outlet may be calculated, for example, by repeating calculations of the following Equations (5) to (8) in this order at a constant period $\Delta t$. In the calculation of a temperature estimate value $T_{es1}$ of the refrigerant, it is assumed that part of the heat generation value of the fuel cell 20 is released by the radiator 530, and that direct heat release from the fuel cell 20 to the ambient air is negligible.

$$P_e = (V_t - V_m) \times I_m \quad \ldots (5)$$

$$P_{c1} = (T_{es1} - T_{am}) \times K_r \quad \ldots (6)$$

$$\Delta T_{es1} = [(P_e - P_{c1}) \times \Delta t]/C_W \quad \ldots (7)$$

$$T_{es1} = T_2 + \Delta T_{es1} \quad \ldots (8)$$

where
$P_e$ is a heat generation value [W] of the fuel cell 20,
$V_t$ is a theoretical electromotive voltage [V] of the fuel cell 20,
$V_m$ is a generated-voltage measured value [V] of the fuel cell 20 measured by the FC sensor 30,
$I_m$ is a generated-current measured value [A] of the fuel cell 20 measured by the FC sensor 30,
$T_2$ is a temperature measured value [° C.] of the inlet temperature sensor 550,
$\Delta T_{es1}$ is a refrigerant temperature-rise estimate value [° C.] over a duration of one period $\Delta t$,
$P_{c1}$ is a heat release quantity [W] of the radiator 530,
$T_{am}$ is a temperature estimate value [T] of the ambient-air temperature sensor 40,
$\Delta t$ is a repetitive period [s] of calculations of Equations (5) to (8),
$C_W$ is a heat capacity [J/° C.] of the refrigerant, and
$K_r$ is a heat release coefficient [W/° C.] of the radiator 530.

It should be noted that the decision conditions in step S345 may include not only the comparison described above with step S345, but also its duration (time duration while a Yes continues at step S345).

It should be also noted that during the normal operation of the fuel cell system 10, the temperature estimate value of the refrigerant at the refrigerant outlet of the fuel cell 20 (i.e., the temperature target value of the refrigerant) is, preferably, within a proper temperature range for the fuel cell 20 to perform efficient power generation. It should be further noted that the term "temperature decision threshold value" used in step S345 is an upper-limit value for deciding that an actual-measurement refrigerant temperature value has undergone an excessive rise during normal operation, the temperature decision threshold value being experimentally or empirically set in advance.

As described hereinabove, in the third embodiment, the controller 700 executes the refrigerant abnormal-temperature-rise decision before executing the refrigerant leak decision process. Then, if it is decided that the refrigerant has undergone an abnormal temperature rise, the controller 700 sets the rotating speed of the refrigerant pump 570 to the rotating speed threshold value or more before executing the refrigerant leak decision process. Thus, the decision as to a refrigerant leak can be fulfilled even more accurately.

The disclosure is not limited to the above-described embodiments and modifications, and may be implemented in various ways within a scope that does not depart from its gist. For example, technical features in the embodiments and modifications corresponding to technical features in the individual modes described in the section of SUMMARY may be interchanged or combined in various ways as required in order to solve part or entirety of the above-described problems or to achieve part or entirety of the above-described advantageous effects. Furthermore, component elements other than elements described in the independent claims out of the component elements in the above-described embodiments and modifications are additional elements and therefore may be omitted as required.

What is claimed is:

1. A fuel cell system comprising:
   a fuel cell;
   a cooling system having a refrigerant pump configured to deliver a refrigerant to the fuel cell;
   a rotating speed acquisition part configured to acquire a rotating speed value of the refrigerant pump;
   a power consumption acquisition part configured to acquire a power consumption of the refrigerant pump;
   an outlet temperature sensor configured to measure a temperature of the refrigerant at a refrigerant outlet of the fuel cell; and
   a controller configured to receive the rotating speed value acquired by the rotating speed acquisition part and control the refrigerant pump,
   wherein the controller has stored therein a predetermined correspondence between rotating speeds of the refrigerant pump and power consumption thresholds,
   the controller is configured to execute a refrigerant leak decision process for deciding presence or absence of a refrigerant leak while executing constant rotating speed control for the refrigerant pump, and
   in the refrigerant leak decision process, with reference to the predetermined correspondence by using the rotating speed value acquired by the rotating speed acquisition part, the controller determines a power consumption threshold value corresponding to the rotating speed value, and decides that a refrigerant leak has occurred if a power consumption value acquired by the power consumption acquisition part is equal to or lower than the power consumption threshold value corresponding to the rotating speed value,
   wherein when the rotating speed value is less than a predetermined rotating speed threshold value, the controller increases the rotating speed of the refrigerant pump to the predetermined rotating speed threshold value or more before executing the refrigerant leak decision process, and
   wherein the controller is configured to decide whether or not a refrigerant temperature measured by the outlet temperature sensor satisfies a temperature-rise abnormality condition that is set in advance as a possible result from a refrigerant leak, and
   the controller is configured to start the refrigerant leak decision process if the temperature-rise abnormality condition is satisfied.

2. The fuel cell system in accordance with claim 1, wherein
   the controller is configured to:
   acquire, as an initial refrigerant temperature value, a refrigerant temperature measured by the outlet temperature sensor at a start-up of the fuel cell system, thereafter calculate a temperature estimate value of the refrigerant at the refrigerant outlet based on an operating state of the fuel cell system, and then acquire, as an actual-measurement refrigerant temperature value, a refrigerant temperature measured by the outlet temperature sensor at a time point when the temperature estimate value has reached a predetermined decision start threshold value, and decide that the temperature-rise abnormality condition has been satisfied if an actual-measurement refrigerant temperature rise value, which is a difference resulting from subtracting the initial refrigerant temperature value from the actual-measurement refrigerant temperature value, is equal to or less than a predetermined temperature rise threshold value at a time point when the actual-measurement refrigerant temperature value has been acquired.

3. The fuel cell system in accordance with claim 1, wherein the controller is configured to:

acquire, as an actual-measurement refrigerant temperature value, a refrigerant temperature measured by the outlet temperature sensor during normal operation of the fuel cell system, and calculate a temperature estimate value of the refrigerant at the refrigerant outlet based on an operating state of the fuel cell system, and decide that the abnormal-temperature-rise condition has been satisfied if a difference resulting from subtracting the temperature estimate value from the actual-measurement refrigerant temperature value is equal to or more than a predetermined temperature decision threshold value.

* * * * *